(12) United States Patent
Law et al.

(10) Patent No.: US 10,656,355 B2
(45) Date of Patent: May 19, 2020

(54) HEAT DISSIPATION STRUCTURE OF HORIZONTAL OPTICAL-COMMUNICATION SUB-ASSEMBLY

(71) Applicant: LuxNet Corporation, Taoyuan (TW)

(72) Inventors: Pi-Cheng Law, Taoyuan (TW);
Po-Chao Huang, Taoyuan (TW);
Hsing-Yen Lin, Taoyuan (TW);
Ya-Hsin Deng, Taoyuan (TW);
Hua-Hsin Su, Taoyuan (TW)

(73) Assignee: LUXNET CORPORATION, Taoyuan (TW)

( * ) Notice: Subject to any disclaimer, the term of this patent is extended or adjusted under 35 U.S.C. 154(b) by 0 days.

(21) Appl. No.: 16/413,145

(22) Filed: May 15, 2019

(65) Prior Publication Data
US 2019/0361181 A1    Nov. 28, 2019

(30) Foreign Application Priority Data
May 24, 2018    (TW) .............................. 107206834 U (51) Int. Cl.
*G02B 6/36*    (2006.01)
*G02B 6/42*    (2006.01)

(52) U.S. Cl.
CPC ......... *G02B 6/4269* (2013.01); *G02B 6/4206* (2013.01); *G02B 6/4271* (2013.01); *G02B 6/4293* (2013.01)

(58) Field of Classification Search
CPC .. G02B 6/4269; G02B 6/4271; G02B 6/4206; G02B 6/4293; G02B 6/4263
See application file for complete search history.

(56) References Cited

U.S. PATENT DOCUMENTS

| | | | |
|---|---|---|---|
| 9,548,817 B1* | 1/2017 | Nagarajan | H01S 5/0612 |
| 2004/0081410 A1* | 4/2004 | Aronson | H01S 5/02212 |
| | | | 385/92 |
| 2004/0129441 A1* | 7/2004 | Giaretta | H01S 5/02212 |
| | | | 174/548 |
| 2013/0156418 A1* | 6/2013 | Stapleton | H04B 10/503 |
| | | | 398/25 |
| 2017/0093488 A1* | 3/2017 | Wang | H04B 10/07955 |

* cited by examiner

*Primary Examiner* — Ellen E Kim
(74) *Attorney, Agent, or Firm* — WPAT, PC (57) ABSTRACT

The heat dissipation structure of a horizontal optical-communication sub-assembly is provided, which includes a T-shaped header, a circuit board and a heat-dissipating support insert. The T-shaped header includes a base and a tongue. The tongue is disposed on one side of the base and is perpendicular to the base. The base includes a first through hole and a second through hole. The first through hole is above the tongue and the second through hole is below the tongue and opposite to the first through hole. One end of the circuit board penetrates through the first through hole and disposed on the tongue. The heat-dissipating support insert includes a supporting block and an extension portion. The extension portion is disposed on one side of the supporting block and penetrates through the second through hole to extend to the bottom of the tongue.

20 Claims, 5 Drawing Sheets

HEAT DISSIPATION STRUCTURE OF HORIZONTAL OPTICAL-COMMUNICATION SUB-ASSEMBLY

CROSS-REFERENCE TO RELATED APPLICATION

This application claims the benefit of Taiwan Patent Application No. 107206834, filed on May 24, 2018, in Taiwan Intellectual Property Office, the disclosure of which is incorporated herein in its entirety by reference.

BACKGROUND OF THE INVENTION

1. Technical Field

The present invention relates to the heat dissipation structure of an optical-communication sub-assembly. More particularly, the invention relates to a heat dissipation structure for supporting an optical-communication sub-assembly in a horizontal position and for dissipating heat from the optical-communication sub-assembly.

2. Description of Related Art

Fiber-optic communication pertains to the field of wired communication and refers to a method for transmitting information through light and optical fibers. Light can carry information after modulation.

Featuring fast and low-loss transmission, optical fibers are now widely used in many countries as a major means of transmission in and between network systems; nevertheless, the data transmission capacity of optical fibers has gradually become insufficient, given that more and more information is being and needs to be transmitted, and that network users demand increasingly higher data transfer rates. To cope with the vast amounts of data to be transmitted, high-frequency transmission is called for.

During high-frequency transmission, however, the electronic components and optoelectronic components involved, particularly laser diodes (LDs), tend to generate considerable heat. A laser diode generates a significant amount of heat during operation, and if not removed in a timely manner, the heat will accumulate and thus increase the temperature of the laser diode. As the characteristic curve of a laser diode varies readily with temperature, the junction temperature of a laser diode will rise if the heat generated by the laser diode is not dissipated early enough. Should that happen, the performance and service lifetime of the laser diode, and hence of the device using the laser diode, will deteriorate, and this raises concerns about device reliability. To ensure the reliability of such devices, it is imperative to solve the heat dissipation issue stated above.

BRIEF SUMMARY OF THE INVENTION

The primary objective of the present invention is to solve the problem that an optical-communication sub-assembly may be of low performance and have a short service lifetime due to the huge amount of heat generated during high-frequency transmission.

To achieve the foresaid objective, the present invention provides a heat dissipation structure of a horizontal optical-communication sub-assembly, including: a T-shaped header, a circuit board and a heat-dissipating support insert. The T-shaped header includes a base and a tongue. The tongue is disposed on one side of the base and is perpendicular to the base. The base includes a first through hole and a second through hole. The first through hole is above the tongue and the second through hole is below the tongue and opposite to the first through hole. One end of the circuit board penetrates through the first through hole and disposed on the tongue. The heat-dissipating support insert includes a supporting block and an extension portion. The extension portion is disposed on one side of the supporting block and penetrates through the second through hole to extend to the bottom of the tongue, whereby the supporting block supports the T-shaped header and the tongue of the T-shaped header lies horizontally.

DETAILED DESCRIPTION OF THE INVENTION

The details and technical contents of the present invention are hereunder described with reference to accompanying drawings. For illustrative sake, the accompanying drawings are not drawn to scale. The accompanying drawings and the scale thereof are not restrictive of the present invention.

Figure 1:
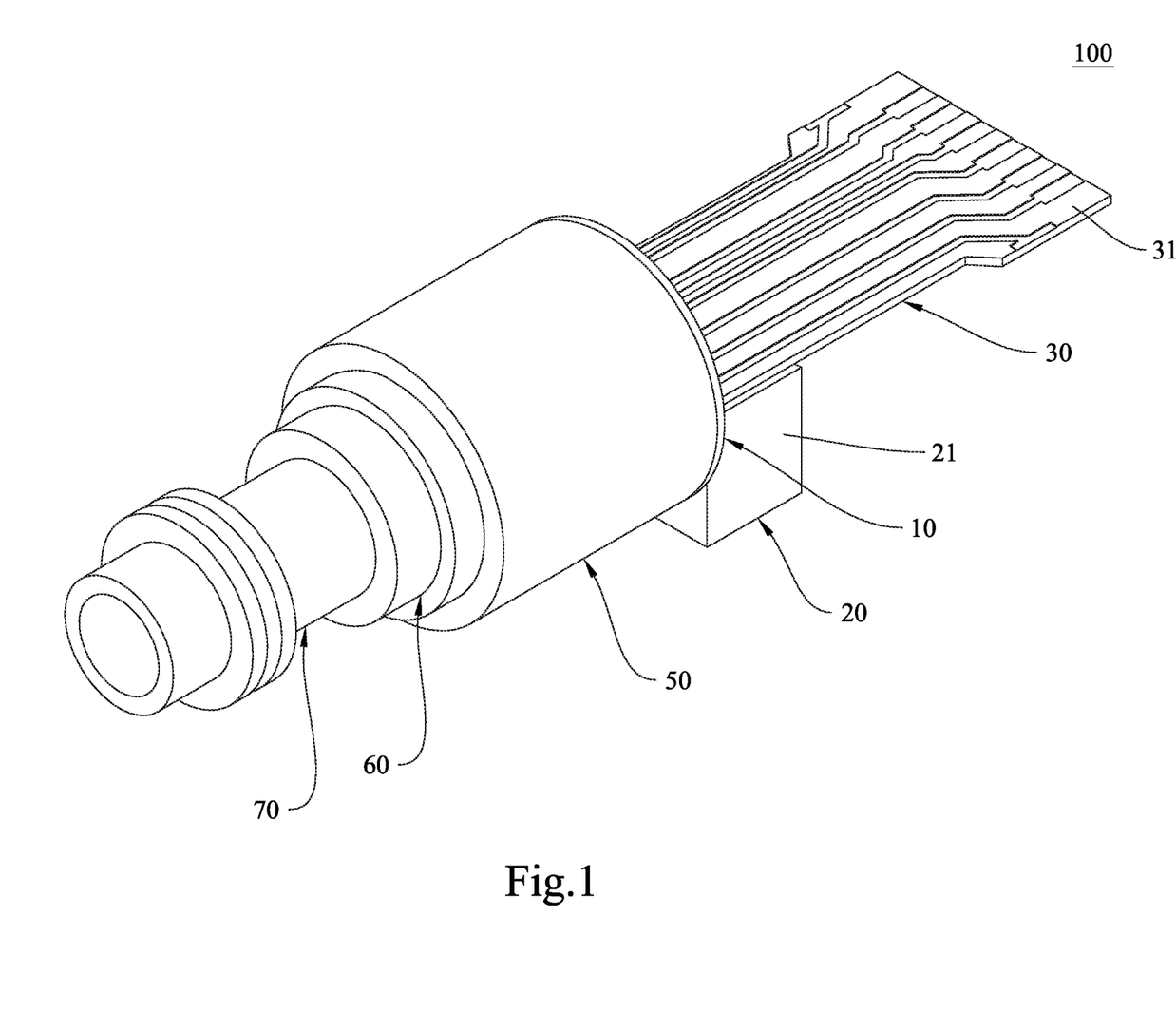
FIG. 1 is the perspective view of the optical-communication sub-assembly according to an embodiment of the present invention.

Please refer to FIG. 1 for a perspective view of the optical-communication sub-assembly according to an embodiment of the present invention.

The optical-communication sub-assembly 100 shown in FIG. 1 is configured as an independent optical transmitter for use in a short wavelength division multiplexing (SWDM), parallel single mode fiber 4-lane (PSM4), coarse wavelength division multiplexing (CWDM), or dense wavelength division multiplexing (DWDM) system. The optical-communication sub-assembly 100 as a whole can be detached independently. For example, the optical-communication sub-assembly 100 can be replaced as a single component when malfunctioning, without having to remove and replace the entire assembly.

Figure 2:
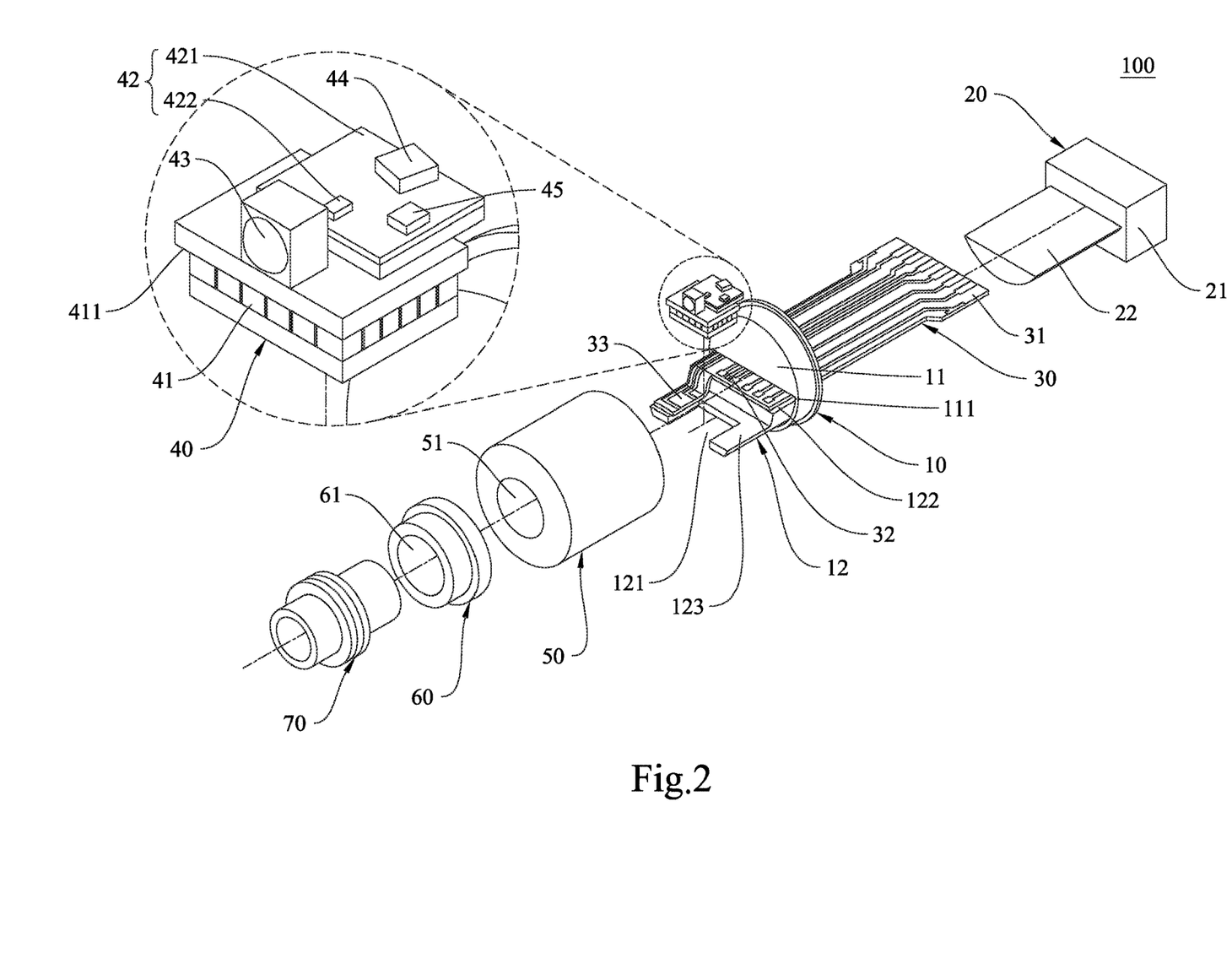
FIG. 2 is the exploded perspective views of the optical-communication sub-assembly according to an embodiment of the present invention.
Figure 3:
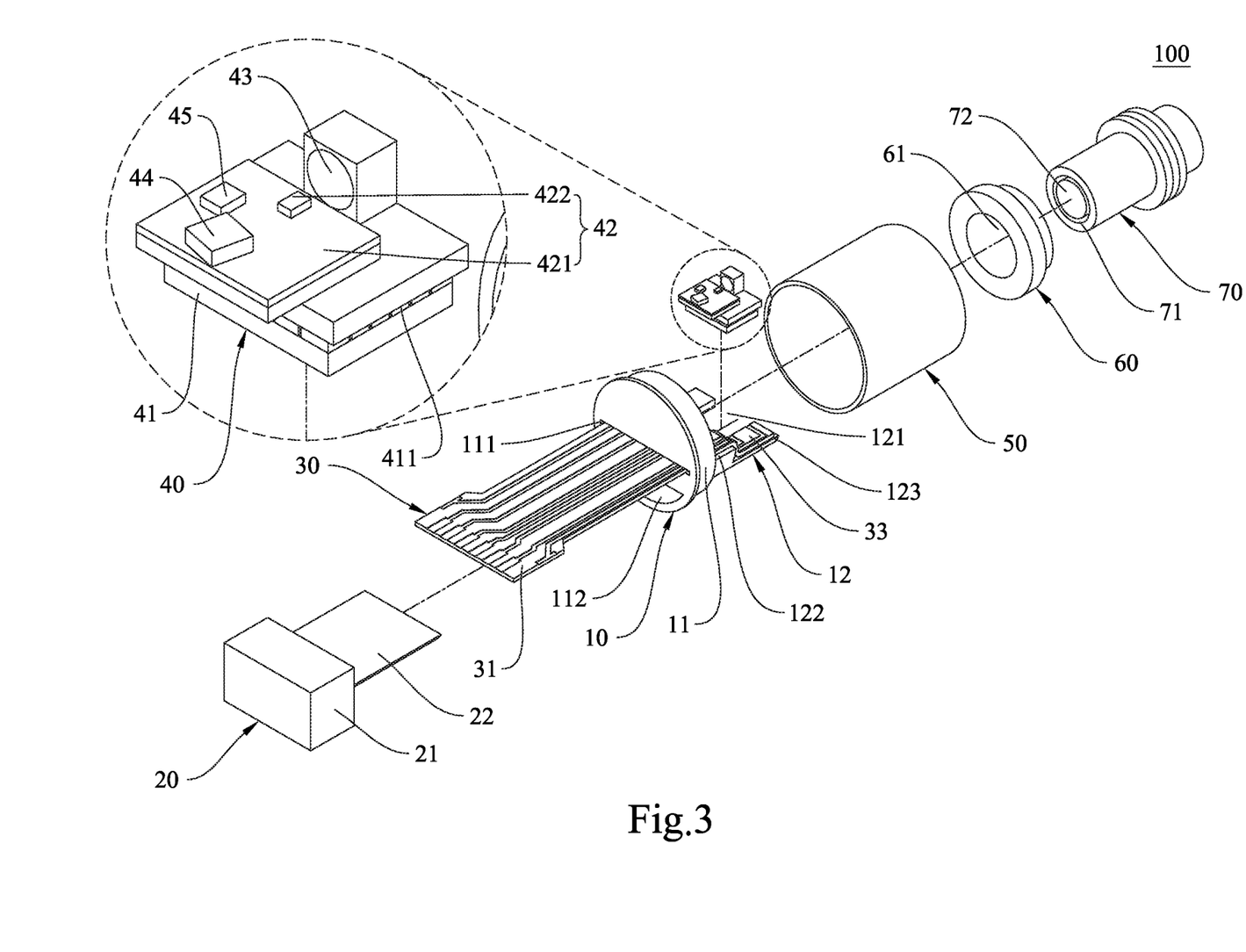
FIG. 3 is the exploded perspective views of the optical-communication sub-assembly according to an embodiment of the present invention.

The structural details of the optical-communication sub-assembly of the present invention are described below with reference to FIG. 2 and FIG. 3, which are two exploded perspective views of the optical-communication sub-assembly in FIG. 1.

The horizontal optical-communication sub-assembly 100 according to this embodiment includes a T-shaped header 10, a heat-dissipating support insert 20, a circuit board 30, an optical transmitter module 40, a supporting element 50, a Z-axis positioning base 60, and an optical-fiber receptacle 70.

The T-shaped header 10 includes a base 11 and a tongue 12. The tongue 12 is disposed on one side of the base 11 and perpendicular to the base 11. The base 11 includes a first through hole 111 and a second through hole 112. The first through hole 111 is above the tongue 12 and the second through hole 112 is below the tongue 12 and opposite to the first through hole 111.

The heat-dissipating support insert 20 includes a supporting block 21 and an extension portion 22. The extension portion 22 is disposed on one side of the supporting block 21. The extension portion 22 is inserted through the second through hole 112 to extend to the bottom of the tongue 12 so as to support the tongue 12. The supporting block 21 supports the T-shaped header 10. The above structure design allows the tongue 12 of the T-shaped header 10 to lie horizontally. In addition, in the embodiment, so as to conform to the desired circular symmetry of the T-shaped header 10 and of the supporting element 50, the extension portion 22 can be substantially semicircular and the shape of the second through hole 112 is corresponding to that of the extension portion 22, such that the extension portion 22 can be inserted through the second through hole 112 and enter the cylindrical space in the supporting element 50. Via the above structure design, the extension portion 22 can effectively support the tongue 12 and the optical transmitter module 40. The supporting block 21 is used to support the T-shaped header 10, such that the tongue 12 of the T-shaped header 10 can lie horizontally. Therefore, the bottom of the supporting block 21 should have flat surface for the supporting block 21 to stably stand. The support block 21 may be a rectangular cuboid, a cube, a half cylinder, a quarter of a cylinder, or a block of any other shape which can stably stand. In a preferred embodiment, the supporting block 21 is a quarter of a cylinder and has a curved guide surface, and the circuit board 30 (e.g., a flexible printed circuit board) is curved along the curved guide surface. In a preferred embodiment, the heat-dissipating support insert 20 is made of copper-tungsten (CuW) to reduce thermal expansion, which may cause the shifting rays of light coupling in the horizontal direction as well as the vertical stacking direction. Apart from copper-tungsten, the heat-dissipating support insert 20 can be made of ceramic, metals, metal alloys, composite materials, or materials with high thermal conductivity and a small coefficient of thermal expansion; the present invention has no limitation in this regard.

Besides, the heat dissipation structure of the optical-communication sub-assembly 100 further includes a plurality of pads (not shown in the drawings), which are disposed on the bottom of the supporting element 50 and the bottom of the supporting block 21 respectively; The pads are made of a flexible material with high thermal conductivity and low thermal expansion coefficient. In a preferred embodiment, the pad may be thermal conductive pad, thermal tape, artificial graphite sheet, potting compound, thermal grease, thermal putty, silicone thermal conductive pad, non-silicone thermal conductive pad, etc. When the optical-communication sub-assembly 100 is installed on the housing of an optical transceiver, the supporting element 50 and the supporting block 21 can contact the housing of the optical transceiver via the pads. These pads can effectively expel the air of the contact surfaces between the above elements, such that the supporting element 50 and the supporting block 21 can be firmly fixed on the housing of the optical transceiver. In this way, the heat generated by the optical-communication sub-assembly 100 can be conducted from the supporting element 50 and the supporting block 21 to the optical receiver, so the optical-communication sub-assembly 100 can achieve great heat dissipation effect.

The circuit board 30 is electrically connected to the optical transmitter module 40, which is disposed at the T-shaped header 10 as detailed further below. The circuit board 30 extends through the first through hole 111 of the base 11 such that one end of the circuit board 30 forms the tail 31 of the optical-communication sub-assembly 100. The tail 31 is configured to connect electrically with a circuit board in an optical communication device, in order for the circuit board 30 to receive electric power and signals from the optical communication device. In a preferred embodiment, the tail 31 is connectable to a circuit board of an optical communication device through a connector, by soldering, by an electrically conductive adhesive, or by other similar means; the present invention, however, has no limitation in this regard. The gap between the circuit board 30 and the wall of the first through hole 111 can be filled, and thus sealed with a sealant to ensure airtightness. In a preferred embodiment, the circuit board 30 is a printed circuit board (PCB), a flexible printed circuit (FPC) board, a ceramic printed circuit board (ceramic PCB), or the like; the present invention, however, has no limitation in this regard.

In the embodiment, the tongue 12 includes a first planar portion 122 and a second planar portion 123. The tongue 12 further includes a step. One end, penetrating through the first through hole 111, of the circuit board 30 is disposed on the first planar portion 122. Besides, the circuit board 330 includes a branch. The branch extends from the first planar portion 122, passing through the step, to the second planar portion 123.

The optical transmitter module 40 is disposed on the tongue 12 or the extension portion 22. In the present invention, the optical transmitter module 40 refers to all the electronic components and optoelectronic components required for generating laser light signals. For example, the optical transmitter module 40 includes a thermoelectric cooler (TEC) 41, an optical transmitter sub-module 42, an aspherical lens 43, a monitor photodiode (MPD) 44, a thermistor 45, and so on. The foregoing components may be selectively dispensed with in certain products; the present invention has no limitation in this regard. In the embodiment illustrated herein, the tongue 12 has an accommodating groove 121, which opens at an upper side of the extension portion 22, and the optical transmitter module 40 (particularly the thermoelectric cooler 41) is disposed in the accommodating groove 121 and in direct contact with the extension portion 22. In another preferred embodiment, the tongue 12 may have a flat or raised surface to facilitate placement of the optical transmitter module 40 (particularly the thermoelectric cooler 41). In the embodiment illustrated herein, thermal conduction takes place along a path that passes sequentially through the tongue 12 and the extension portion 22.

Figure 4:
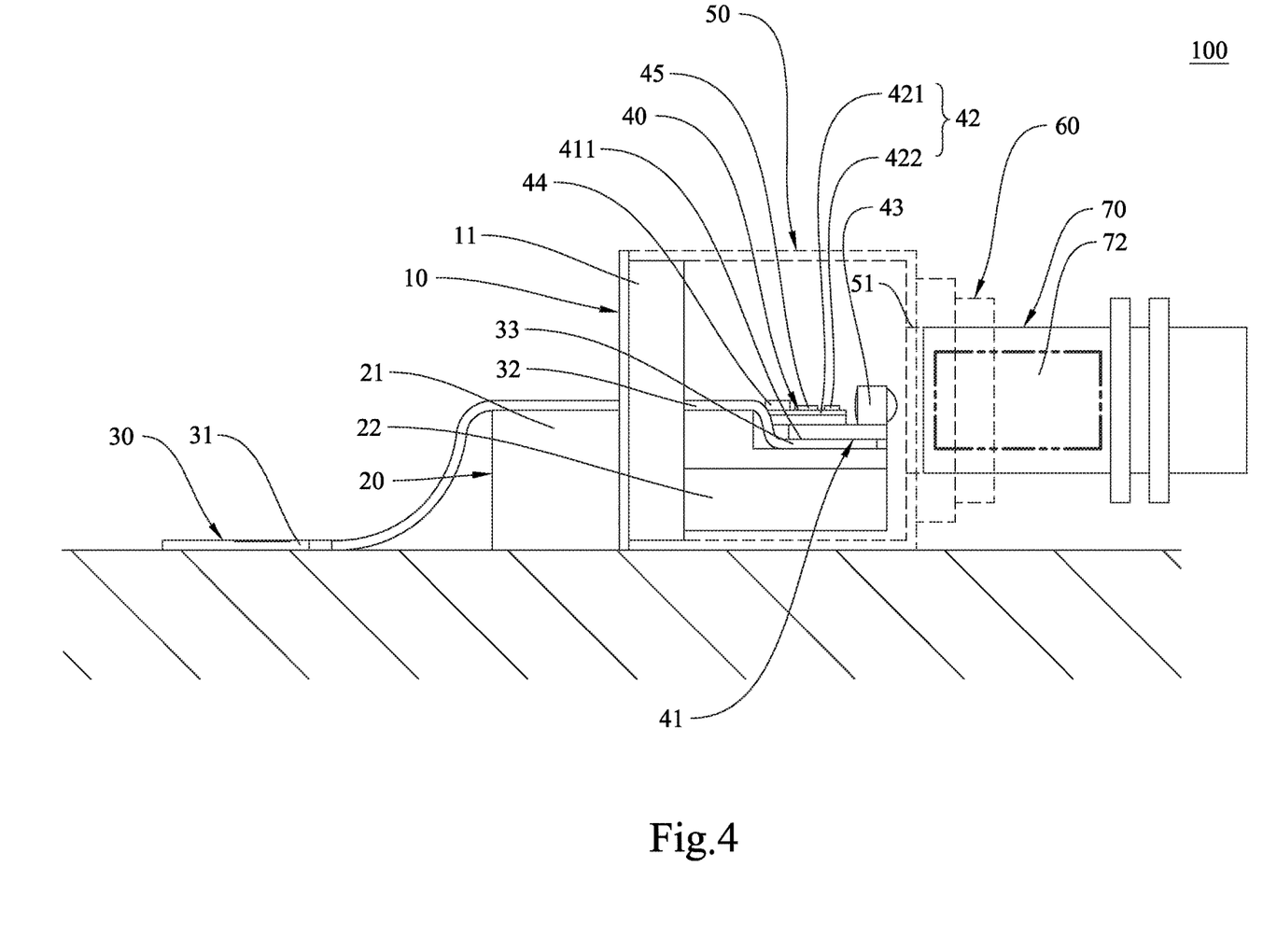
FIG. 4 is the sectional view of the optical-communication sub-assembly according to an embodiment of the present invention.

Please refer to FIG. 4 for a sectional view of the optical-communication sub-assembly in FIG. 1.

The thermoelectric cooler 41 is configured to lower the temperature of the optical transmitter sub-module 42 through the thermoelectric effect and has a cold side and a hot side. Conventionally, considering heat exchange efficiency, the surface area of the hot side (i.e. the bottom side) of currently available thermoelectric coolers is greater than that of the cold side (i.e. the top side) thereof. However, the structure design of the thermoelectric cooler 41 in the embodiment is different from that of the currently available thermoelectric coolers. The surface area of the cold side (i.e. the top side) of the thermoelectric cooler 41 is greater than that of the hot side (i.e. the bottom side) thereof. Via the above structure design, the thermoelectric cooler 41 can be properly integrated with the tongue 12 and the circuit board 30. The bottom of the cold side of the thermoelectric cooler 41 includes a power supply port 411, so the surface area of the cold side of the thermoelectric cooler 41 is greater than that of the hot side thereof. Besides, the hot side of the thermoelectric cooler 41 directly contacts the extension portion 22 made of a material with high thermal conductivity and low thermal expansion coefficient, and the cold side of the thermoelectric cooler 41 directly carries the aspherical lens 43 and the optical transmitter sub-module 42. As the cold side of the thermoelectric cooler 41 has larger surface area, so can mount more electronic components and optoelectronic components, and effectively dissipate the heat generated by these electronic components and optoelectronic components. Although the area of the hot side of the thermoelectric cooler 41 is less than that of the cold side thereof, the hot side can still effectively conduct the heat generated by these electronic components and optoelectronic components to the supporting block 21 because the hot side directly contacts the extension portion 22 having high thermal conductivity and low thermal expansion coefficient. Moreover, the hot side of the thermoelectric cooler 41 is directly attached to the extension portion 22, which can shorten the path of thermal conduction in order to increase heat dissipation efficiency. The cold side of the thermoelectric cooler 41 carries the aspherical lens 43 and the optical transmitter sub-module 42. The heat-dissipating support insert 20 is made of a material with high thermal conductivity and low thermal expansion coefficient, such as copper-tungsten, etc., to effectively reduce thermal expansion, which shall cause shifting rays of light coupling in the vertical stacking direction and the horizontal direction.

In another embodiment, the thermoelectric cooler 41 can be replaced by a currently available thermoelectric cooler. The thermoelectric cooler is packaged upside down; besides, positive current is inputted into the negative electrode of the thermoelectric cooler and negative current is inputted into the positive electrode of the thermoelectric cooler in order to switch the hot side and the cold side thereof.

The optical transmitter sub-module 42 is disposed on the cold side the thermoelectric cooler 41 in order for the thermoelectric cooler 41 to absorb heat from the optical transmitter sub-module 42. In this embodiment, the optical transmitter sub-module 42 includes a sub-base 421 and a laser diode 422. The sub-base 421 is disposed on the thermoelectric cooler 41 and the laser diode 422 is disposed on the sub-base 421 and connected to the circuit board 30 through the circuit on the sub-base 421 so as to convert electrical signals fed from the circuit board 30 into optical signals and output the optical signals. In this embodiment, the laser diode 422 is an edge emitting laser diode. In other preferred embodiments, vertical-cavity surface-emitting laser (VCSEL) diodes may be used instead; in that case, only the orientation of the sub-base 421 needs to be changed, or an optical element for deflecting light beam is additionally required, with the lens staying aligned in the axial direction.

The aspherical lens 43 is disposed on the thermoelectric cooler 41 to couple the optical signals of the laser diode 422 into the optical-fiber receptacle 70. In the present invention, the aspherical lens 43 (or a spherical lens supported on a metal frame) is used as the light coupling means, and there is no need for a lens-supporting cover (not shown); thus, the conventional double-layer stacked design is simplified to lower the complexity of the optical path and to overcome the difficulties of manufacture, which may otherwise result from the low optical and mechanism tolerances of the conventional double-layer stacked design. Moreover, once the laser diode 422 is soldered or adhesively bonded in place, the aspherical lens 43 can be adjusted in position so that, before the laser diode 422 and the aspherical lens 43 are enclosed, the accuracy of the distance between them can be ensured to enable efficient light coupling. In another preferred embodiment, and by way of example only, the lens is placed in a window 51 of the supporting element 50.

The monitor photodiode 44 and the thermistor 45 are disposed on one side of the laser diode 422 to monitor the output power and temperature of the laser diode 422 respectively. The monitor photodiode 44 and the thermistor 45 are configured to send their respective monitoring data to a controller (not shown) in order to control the output power and working temperature of the laser diode 422 at their respective preferred levels according to the monitoring data. In this embodiment, the optical transmitter sub-module 42 (particularly the sub-base 421) and the aspherical lens 43 are coplanar (i.e., both disposed on the cold side of the thermoelectric cooler 41), and so are the laser diode 422 and the monitor photodiode 44, both of which are disposed on the sub-base 421. The coplanar design not only facilitates positional adjustment during the die bonding process, but also enables effective control over the tolerances in height (in the stacking direction) between the aforesaid components. Furthermore, the coplanar design helps reduce positional errors caused by differences between the thermal expansion coefficients of the materials involved when temperature varies. Please note, however, that the foregoing coplanar structural configuration is not an essential feature of the present invention. Via the above design, the light emitting direction of the laser diode 422 can be vertical to the base 11. In another preferred embodiment, the monitor photodiode 44 is disposed directly on the thermoelectric cooler 41, and in that case, the monitor photodiode 44 may be a surface-receiving monitor photodiode and can be erected so that its light-receiving surface is aligned with the rear side of the laser diode 422, and that its electrode pads to be wire-bonded are located on the opposite side of the surface-receiving monitor photodiode 44 in relation to the side in contact with the thermoelectric cooler 41, in order for the thermoelectric cooler 41 to serve as a support when wire bonding is performed, thereby protecting the monitor photodiode 44 from breaking during the wire bonding process. The configuration and arrangement of the monitor photodiode 44, however, are not limited to the foregoing.

Referring back to FIG. 1 to FIG. 4, the supporting element 50 is coupled to and covers the T-shaped header 10 and is configured to connect with the Z-axis positioning base 60 and the optical-fiber receptacle 70 so that the optical-communication sub-assembly 100 can connect with an optical fiber (not shown) through the optical-fiber receptacle 70. The Z-axis positioning base 60 is disposed at the window 51 of the supporting element 50 and has an insertion groove 61, in which the optical-fiber receptacle 70 is inserted. The optical-fiber receptacle 70 is configured to be coupled light emitted from the optical transmitter module 40 at the T-shaped header 10. The side of the optical-fiber receptacle 70 that faces the supporting element 50 has an insertion groove 71 and an optical isolator 72 disposed in the insertion groove 71. In a preferred embodiment, the side of the optical isolator 72 that is exposed through the insertion groove 71 is flush with the opening of the insertion groove 71, for if the side of the optical isolator 72 juts out of the insertion groove 71 instead, light coupling through the Z-axis positioning base 60 will be adversely affected in an XY plane. In another preferred embodiment, the window 51 is made larger to increase the range within which the optical isolator 72 can be moved, thereby lowering the difficulty of light coupling; in that case, the aforesaid side of the optical isolator 72 need not be flush with the opening of the insertion groove 71. In a preferred embodiment, an anti-reflection glass plate or filter plate is disposed at the window 51 of the supporting element 50 to ensure airtightness of the supporting element 50.

Alignment for light coupling begins by determining the distance between the laser diode 422 and the aspherical lens 43. The aspherical lens 43 is moved until the optimal light-coupling position is reached, and only then will the aspherical lens 43 be bonded to the cold side of the thermoelectric cooler 41. The supporting element 50 is jointed to the T-shaped header 10 by laser beam welding after the laser diode 422 and the aspherical lens 43 are fixed in place at the required spacing. Following that, the optical-fiber receptacle 70 is inserted into the insertion groove 61 of the Z-axis positioning base 60, and the Z-axis positioning base 60 is moved to the optimal light-coupling position (to complete alignment in the X-, Y-, and Z-axis directions first), before the optical-fiber receptacle 70 is fixed to the Z-axis positioning base 60 (i.e., fixed in position in the Z-axis direction) by laser beam or electric resistance welding. Lastly, the assembly of the optical-fiber receptacle 70 and the Z-axis positioning base 60 is moved along the plane of the window 51 (to complete alignment in the X- and Y-axis directions), and when the optimal light-coupling position is reached, the Z-axis positioning base 60 and the supporting element 50 are jointed together (i.e., fixed in position in the X- and Y-axis directions) by laser beam or electric resistance welding. Besides, after the extension portion 22 is inserted through the second through hole 112, the extension portion 22 can be further fixed in the second through hole 112 by electric resistance welding or sealant in order to enhance the airtightness between the supporting element 50 and T-shaped header 10.

To facilitate laser beam or electric resistance welding, the base 11 of the T-shaped header 10 has a circular periphery, and the supporting element 50 is cylindrical and configured to be mounted around the periphery of the base 11 in order for the welded positions to have circular symmetry. Similarly, the Z-axis positioning base 60 may have a circular outer periphery in order for the welded positions to be circularly symmetric; and the optical-fiber receptacle 70 may have a circular outer periphery, and the insertion groove 61 of the Z-axis positioning base 60 may have a circular inner periphery in order for the welded positions to be circularly symmetric. When circular symmetry exists, the laser beam or electric resistance welding apparatus being used can maintain a constant spacing between each two welding points during operation to avoid structural instability which may otherwise result from inconsistent welding power and hence inconsistent welding temperature.

Instead of laser beam welding, the supporting element 50 may be jointed to the T-shaped header 10 by electric resistance welding for a higher level of airtightness at the junction.

Figure 5:
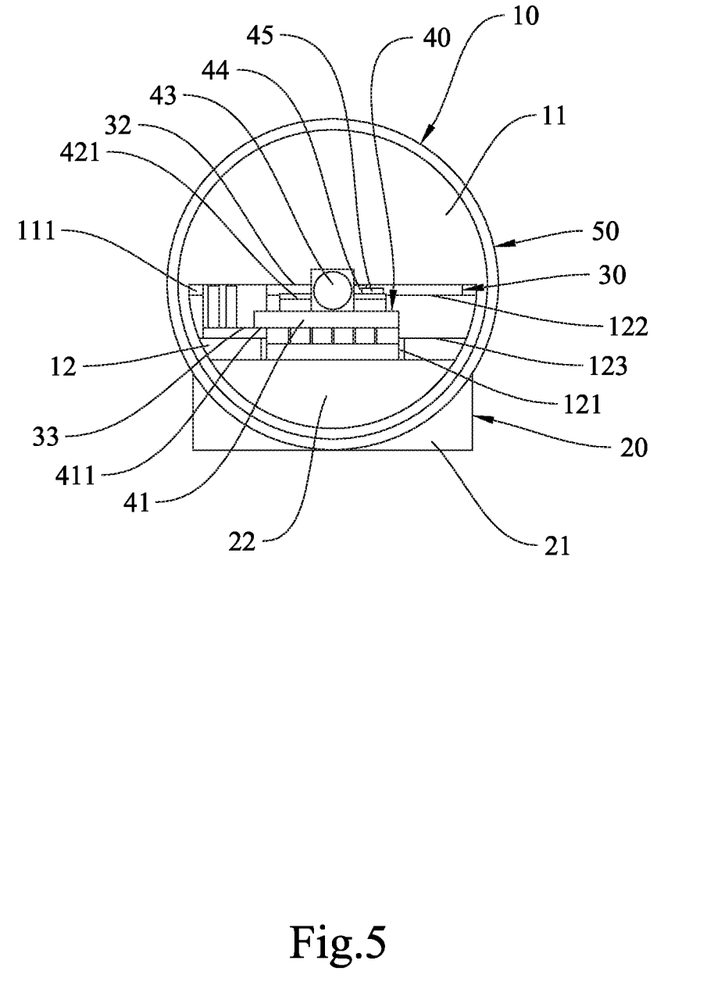
FIG. 5 is the front view of the optical-communication sub-assembly according to an embodiment of the present invention.

FIG. 5 shows a front view of the optical-communication sub-assembly in FIG. 1.

To reduce the distances between the circuit board 30 and the components on the sub-base 421 (i.e., to achieve the shortest circuit connections), the tongue 12 includes the first planar portion 122 and the second planar portion 123, wherein the first planar portion 122 is higher than the second planar portion 123 such that the step is formed therebetween. The end of the circuit board 30 that is the opposite end in relation to the tail 31 (see FIG. 4) has a signal connecting portion 32 and a power supply connecting portion 33. The signal connecting portion 32 is disposed on the first planar portion 122, is flush with the sub-base 421 (or the laser diode 422 (see FIG. 4), the monitor photodiode 44, and the thermistor 45), and is electrically connected to the electronic components and optoelectronic components of the optical transmitter sub-module 42. The branch of one end of the circuit board 30 extends from the first planar portion 122, passing through the step, to the second planar portion 123, such that the power supply connecting portion 33 extends from the first planar portion 122 to the second planar portion 123. Via the above structure, when the optical transmitter module 40 is disposed in the accommodating groove 121 and directly contacts the extension portion 22, the total thickness of the thermoelectric cooler 41 and the sub-base 421 is substantially equal to the sum of the thickness from the bottom of the tongue 12 to the second planar portion 123 and the thickness of the step. In this way, the plane where the laser diode 422, the monitor photodiode 44 and the thermistor 45 of the optical transmitter sub-module 42 are disposed can be substantially the same with the plane where the circuit board 30 is disposed, so the laser diode 422, the monitor photodiode 44 and the thermistor 45 of the optical transmitter sub-module 42 can directly electrically contact the signal connecting portion 32. In addition, when the optical transmitter module 40 is disposed in the accommodating groove 121 and directly contacts the extension portion 22, the power supply port 411 on the bottom of the cold side of the thermoelectric cooler 41 can be just slightly higher than the power supply connecting portion 33. In this way, the power supply connecting portion 33 can directly electrically contact the power supply port 411 by welding or via a conductive material so as to minimize the distance between the power supply connecting port 33 and the power supply port 411. The foregoing structure significantly reduces the distances between the signal connecting portion 32 and the components; the above structure design can effectively solve the issues of impedance mismatching and radiofrequency (RF) interference caused by wire bonding or die bonding. Besides, the power supply connecting portion 33 of the circuit board 30 extends from the first planar portion 122 to the second planar portion 123 and is electrically connected to the thermoelectric cooler 41. As high-frequency signals and DC power signals trace along two different paths (i.e., the upper first planar portion 122 and the lower second planar portion 123) respectively, separation between the two types of signals is ensured, and the signal integrity (SI) of high-frequency signals and the power integrity (PI) of the DC power signal are thus maintained. In this embodiment, the thermoelectric cooler 41 is oriented to the left (with reference to FIG. 2), and yet the thermoelectric cooler 41 may alternatively be turned rightward or rearward as needed; the present invention has no limitation in this regard. When the thermoelectric cooler 41 faces rearward, the accommodating groove 121 must also extend rearward in order for the sub-base 421 to be adjacent to the signal connecting portion 32 of the circuit board 30.

As described above, so as to enlarge the interior space of the supporting element 50 and increase the number of components that can be disposed on the thermoelectric cooler 41, the thermoelectric cooler 41 in a preferred embodiment is packaged upside down and is fed with electric power whose polarities are reversed as opposed to those illustrated herein such that the cold and hot sides of the thermoelectric cooler 41 swap positions, i.e., the side with the larger surface area is now converted from the hot side to the cold side for carrying the optical transmitter module 40. When the thermoelectric cooler 41 is inverted, its power supply port 411 faces downward. By redesigning the height of the second planar portion 123, the power supply port 411 of the thermoelectric cooler 41 can be rendered slightly higher than the power supply connecting portion 33 of the circuit board 30 so that the upper side of the power supply connecting portion 33 of the circuit board 30 can be brought into direct electrical contact with the power supply port 411 of the thermoelectric cooler 41 through welding or via a conductive material to shorten the distance between the power supply connecting portion 33 and the power supply port 411.

To sum up, comparing to the prior art, the present invention has the following advantages:

1. The present invention provides an effective solution to heat dissipation from the optical transmitter sub-module of the optical-communication sub-assembly disclosed herein. In addition, a supporting block is used to support the optical-communication sub-assembly so that not only can the T-shaped header of the sub-assembly output light horizontally, but also the area of contact between the supporting block and the housing of the optical transceiver is large enough to ensure mechanism stability.

2. The T-shaped header of the present invention is easy to manufacture and therefore has a lower production or purchase cost than the conventional transistor outline (TO) headers. The T-shaped header also reduces the limitation on high-frequency bandwidth of the conventional TO headers.

3. The distance between the optical transmitter sub-module and aspherical lens of the present invention can be fine-tuned, which is unachievable in a conventional TO-CAN package structure, in which the distance between the optical transmitter and the cap lens is fixed, making it impossible to adjust the light-coupling distance. Besides, there is a limited choice of cap lenses of standard specifications, so manufacturers have only a few of cap lenses to choose from supplies.

While the present invention has been described in connection with certain exemplary embodiments, it is to be understood that the invention is not limited to the disclosed embodiments, but, on the contrary, intended to cover various modifications and equivalent arrangements included within the spirit and scope of the appended claims and equivalents thereof.

What is claimed is:

1. A heat dissipation structure of a horizontal optical-communication sub-assembly, comprising:
   a T-shaped header, comprising a base and a tongue, wherein the tongue is disposed on one side of the base and is perpendicular to the base, and the base comprises a first through hole and a second through hole; the first through hole is above the tongue and the second through hole is below the tongue and opposite to the first through hole;
   a circuit board, wherein one end of the circuit board penetrates through the first through hole and disposed on the tongue; and
   a heat-dissipating support insert comprising a supporting block and an extension portion, wherein the extension portion is disposed on one side of the supporting block and penetrates through the second through hole to extend to a bottom of the tongue, whereby the supporting block supports the T-shaped header and the tongue of the T-shaped header lies horizontally.

2. The heat dissipation structure of the horizontal optical-communication sub-assembly of claim 1, wherein a gap between the first through hole and the circuit board is filled with a sealant.

3. The heat dissipation structure of the horizontal optical-communication sub-assembly of claim 1, wherein the extension portion is fixed in the second through hole by a sealant or an electric resistance welding.

4. The heat dissipation structure of the horizontal optical-communication sub-assembly of claim 1, wherein the T-shaped header comprises an optical transmitter module disposed on the tongue or the extension portion.

5. The heat dissipation structure of the horizontal optical-communication sub-assembly of claim 4, further comprising a supporting element covering the T-shaped header, a Z-axis positioning base disposed on the supporting element, an optical-fiber receptacle disposed on the Z-axis positioning base and configured to couple light emitted from the optical transmitter module and a pad disposed at a bottom of the supporting element.

6. The heat dissipation structure of the horizontal optical-communication sub-assembly of claim 5, wherein the base comprises a circular outer periphery, and the supporting element is cylindrical and configured to be mounted around the periphery of the base in order to achieve circular symmetry.

7. The heat dissipation structure of the horizontal optical-communication sub-assembly of claim 5, wherein the Z-axis positioning base comprises a circular outer periphery and is coupled to a window of the supporting element to achieve circular symmetry.

8. The heat dissipation structure of the horizontal optical-communication sub-assembly of claim 7, wherein the window of the supporting element is provided with an anti-reflection glass plate or an anti-reflection filter plate.

9. The heat dissipation structure of the horizontal optical-communication sub-assembly of claim 5, wherein the optical-fiber receptacle comprises a circular outer periphery, and the insertion groove of the Z-axis positioning base comprises a circular inner periphery in order to achieve circularly symmetric.

10. The heat dissipation structure of the horizontal optical-communication sub-assembly of claim 5, wherein one side of the optical-fiber receptacle that faces the supporting element comprises an insertion groove and an optical isolator is disposed in the insertion groove.

11. The heat dissipation structure of the horizontal optical-communication sub-assembly of claim 10, wherein one side of the optical isolator is flush with an opening of the insertion groove.

12. The heat dissipation structure of the horizontal optical-communication sub-assembly of claim 4, wherein the tongue comprises an accommodating groove above the extension portion, and the optical transmitter module is disposed in the accommodating groove and directly contacts the extension portion.

13. The heat dissipation structure of the horizontal optical-communication sub-assembly of claim 12, wherein the optical transmitter module comprises a thermoelectric cooler disposed on the extension portion, an optical transmitter sub-module disposed on the thermoelectric cooler, and an aspherical lens disposed on the thermoelectric cooler and configured to couple light.

14. The heat dissipation structure of the horizontal optical-communication sub-assembly of claim 13, wherein a hot side of the thermoelectric cooler is attached to the extension portion, and a cold side of the thermoelectric cooler carries the aspherical lens and the optical transmitter sub-module.

15. The heat dissipation structure of the horizontal optical-communication sub-assembly of claim 13, wherein the optical transmitter sub-module comprises a sub-base disposed on the thermoelectric cooler and a laser diode disposed on the sub-base; a light emitting direction of the laser diode is vertical to the base.

16. The heat dissipation structure of the horizontal optical-communication sub-assembly of claim 13, wherein the tongue comprises a first planar portion and a second planar portion, the first planar portion is higher than the second planar portion such that a step is formed therebetween, the circuit board comprises a signal connecting portion disposed on the first planar portion and electrically connected to the optical transmitter sub-module, and the circuit board further comprises a power supply connecting portion extending from the first planar portion to the second planar portion and electrically connected to the thermoelectric cooler.

17. The heat dissipation structure of the horizontal optical-communication sub-assembly of claim 16, wherein when the optical transmitter module is disposed in the accommodating groove and directly contacts the extension portion, a total thickness of the thermoelectric cooler and the sub-base is substantially equal to a sum of a thickness from a bottom of the tongue to the second planar portion and a thickness of the step.

18. The heat dissipation structure of the horizontal optical-communication sub-assembly of claim 17, wherein when the optical transmitter module is disposed in the accommodating groove and directly contacts the extension portion, the laser diode of the optical transmitter sub-module and the signal connecting portion are substantially on the same plane.

19. The heat dissipation structure of the horizontal optical-communication sub-assembly of claim 16, wherein the thermoelectric cooler is inversely packaged, a positive current is inputted into a negative electrode of the thermoelectric cooler and a negative current is inputted into a positive electrode of the thermoelectric cooler; when the thermoelectric cooler is inverted, a power supply port of the thermoelectric cooler faces downward and electrically contacts the power supply connecting portion disposed on an upper side of the circuit board.

20. The heat dissipation structure of the horizontal optical-communication sub-assembly of claim 13, wherein the thermoelectric cooler comprises a cold side, a hot side and a power supply port, and an area of the cold side is greater than an area of the hot side; the power supply port is disposed on a bottom of the cold side of the thermoelectric cooler and directly electrically contacts a power supply connecting portion disposed on an upper side of the circuit board.

* * * * *